United States Patent [19]
Shiosaki

[11] Patent Number: 4,912,575
[45] Date of Patent: Mar. 27, 1990

[54] APPARATUS FOR AUTOMATICALLY CHANGING AN INFORMATION MEMORY MEDIUM

[75] Inventor: Masao Shiosaki, Yokohama, Japan

[73] Assignee: Kabushiki Kaisha Toshiba, Kawasaki, Japan

[21] Appl. No.: 43,252

[22] Filed: Apr. 27, 1987

[30] Foreign Application Priority Data

Apr. 30, 1986 [JP] Japan ................................ 61-100724

[51] Int. Cl.⁴ ............................................ G11B 15/68
[52] U.S. Cl. ...................................... 360/71; 360/92; 360/98.04; 362/34; 362/191; 414/280
[58] Field of Search ................... 360/71, 98, 92, 98.01, 360/98.04–98.06; 358/102; 414/280–281; 369/75.2, 178, 34, 191–195, 201–202

[56] References Cited

U.S. PATENT DOCUMENTS

| | | | |
|---|---|---|---|
| 4,567,584 | 1/1986 | Kawakami . | |
| 4,601,026 | 7/1986 | Kawakami . | |
| 4,607,354 | 8/1986 | Ishibashi | 369/39 |
| 4,614,474 | 9/1986 | Sudo | 360/98 X |
| 4,635,150 | 1/1987 | Kato | 360/98 |
| 4,644,425 | 2/1987 | Tamaki | 360/69 |
| 4,695,990 | 9/1987 | Kawakami . | |

FOREIGN PATENT DOCUMENTS 0163463 5/1985 European Pat. Off. .
3421912 1/1985 Fed. Rep. of Germany .

*Primary Examiner*—A. J. Heinz
*Attorney, Agent, or Firm*—Cushman, Darby & Cushman

[57] ABSTRACT

An automatic changing apparatus includes a storage section wherein a number of optical disk cassettes are stored, a disk drive apparatus, and a transfer frame for transferring the disk cassette between the storage section and the disk drive apparatus. The transfer frame has first and second holding frames for respectively holding the disk cassette. The transfer frame inserts the disk cassette into the storage section or the disk drive apparatus, or removes it therefrom.

17 Claims, 21 Drawing Sheets

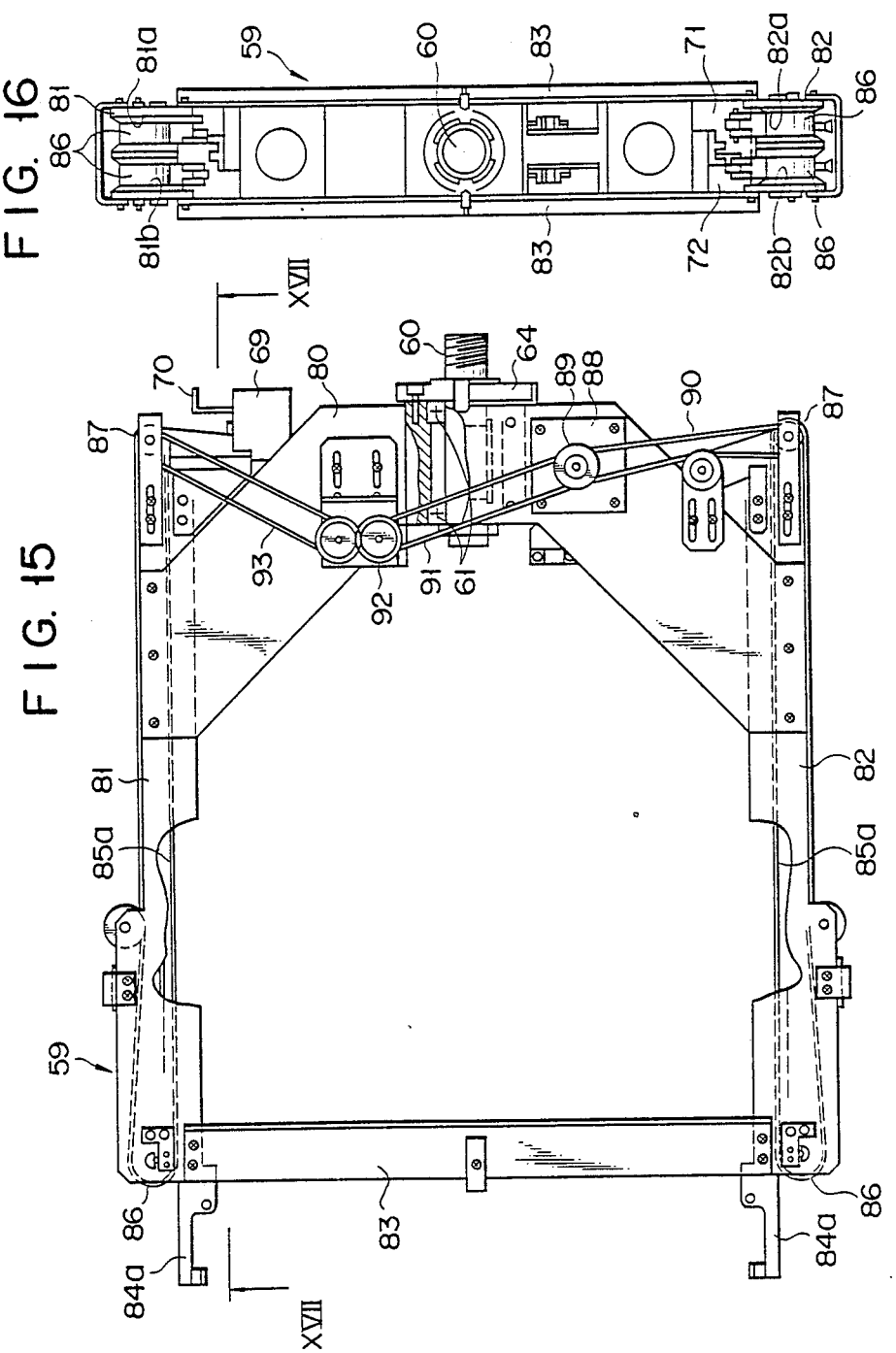

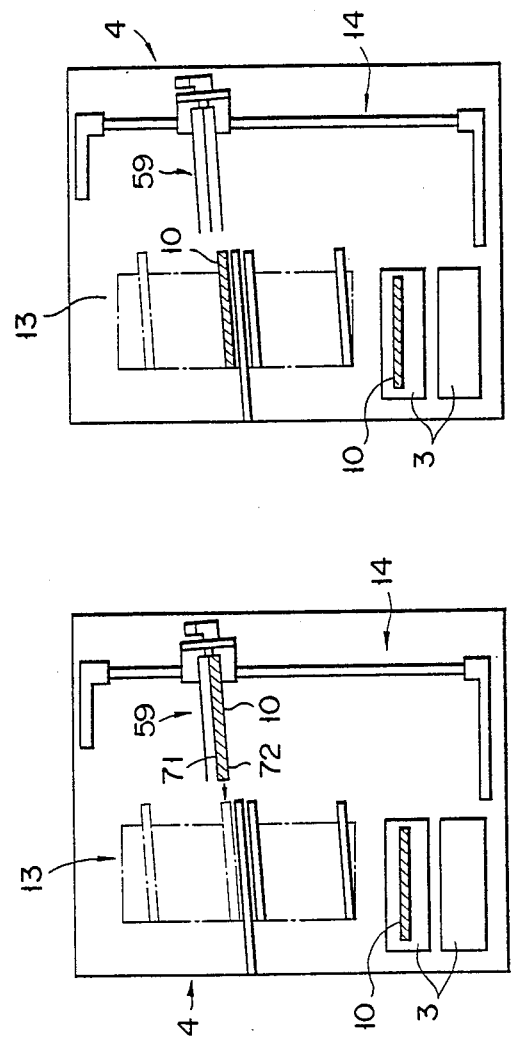

APPARATUS FOR AUTOMATICALLY CHANGING AN INFORMATION MEMORY MEDIUM

BACKGROUND OF THE INVENTION

The present invention relates to a method and an apparatus for automatically changing an information memory medium, and more specifically, to a method and an apparatus for automatically loading an information recording medium into an information processing apparatus or ejecting it therefrom.

A conventional automatic changing apparatus comprises a storage section arranged next to the information processing apparatus to store a large number of information memory media such as optical disk cassettes and a transfer frame for transferring cassettes between the processing apparatus and the storage section. The transfer frame can hold one cassette at a time.

In order to change the cassette loaded in the processing apparatus with another cassette, the transfer frame located in the home or initial position is moved to a position where it opposes the processing apparatus. The cassette ejected from the processing apparatus is received by the transfer frame. The transfer frame is then moved to a position where it opposes the storage section. The cassette held by the frame is transferred to the storage section and is stored where it was. Thereafter, the frame receives a specified or designated cassette from the storage section and is moved to the position where it opposes the processing apparatus. The cassette held by the frame is then loaded in the processing apparatus, thereby completing change of the cassette.

In the cassette change apparatus having the above structure, the transfer frame can hold only one cassette. In order to change the cassette in the processing apparatus, the frame must therefore be reciprocated twice between the processing apparatus and the storage section. For this reason, the disk cassette change time is inevitably prolonged.

SUMMARY OF THE INVENTION

The present invention has been made in consideration of the above circumstances and has as its object to provide an automatic changing apparatus and a method capable of changing information memory media at a high speed.

In order to achieve the above object, according to the present invention, means for transferring information memory media between an information processing apparatus and a storage section includes first and second holding frames formed integrally with each other. These holding frames can hold information memory media, respectively.

With the changing apparatus having the above arrangement, when the memory medium is changed with another medium, a desired memory medium is transferred from the storage section to one holding 3 frame of the transfer means and then the transfer means is moved to the position where it opposes the processing apparatus. In this position, the memory medium ejected from the processing apparatus is received by the other holding frame, and the medium transferred by the transfer means from the storage section is loaded into the processing apparatus. Thereafter, the means is moved to the position where it opposes the storage section. The medium ejected from the processing apparatus is transferred to the storage section and is stored in the position where it was.

BRIEF DESCRIPTION OF THE DRAWINGS

FIGS. 3 to 24E show an automatic disk cassette changing apparatus according to an embodiment of the present invention, in which FIG. 3 is a perspective view showing an internal structure of the apparatus, FIGS. 4 and 5 are respectively a front view and a side view of a storage section in the apparatus, FIG. 6 is a sectional view of the storage section taken along the line VI—VI in FIG. 5, FIGS. 7 to 9 are respectively a plan view, a side view, and a front view of a carrying mechanism, FIG. 10 is a plan view showing a state wherein a cassette is placed on a slider of the carrying mechanism in the correct direction, FIG. 11 is a plan view showing a state wherein a cassette is placed on the slider in the wrong direction, FIG. 12 is a plan view of the carrying mechanism on which a cassette is placed, FIG. 13 is a schematic plan view showing a transfer frame and a positioning mechanism, FIG. 14 is a front view of the positioning mechanism, FIGS. 15 and 16 are respectively a plan view and a rear view showing the detailed arrangement of the transfer frame, FIG. 17 is a sectional view of the transfer frame taken along the line XVII—XVII in FIG. 15, FIG. 18 is a perspective view of a pulley mechanism, FIG. 19 is a schematic side view of the automatic changing apparatus, FIG. 21 is an enlarged perspective view showing part of the cassette, FIGS. 24A to 24E are schematic views showing an operation for changing the cassettes.

DETAILED DESCRIPTION OF THE PREFERRED EMBODIMENTS

Figure 1:
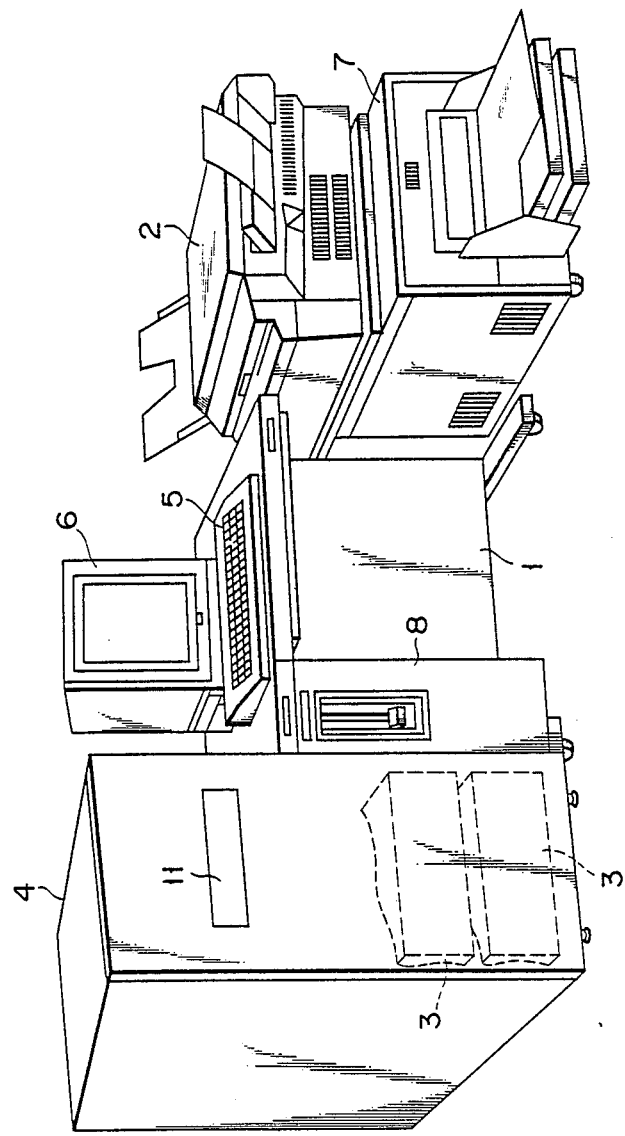
FIG. 1 is a perspective view showing an image retrieval apparatus having an automatic changing apparatus according to the present invention.

A preferred embodiment of the present invention will now be described with reference to FIGS. 1 to 24E. FIG. 1 shows an image information retrieval apparatus having an automatic disk changing apparatus according to the present invention. The retrieval apparatus comprises main controller 1. Controller 1 is connected to reading apparatus 2, automatic disk changing apparatus 4 incorporating two optical disk drive apparatuses (information processing means) 3, keyboard 5, output apparatus 6, recording apparatus 7, and floppy disk apparatus 8. Controller 1 performs various types of image information processing. Reading apparatus 2 comprises, e.g., a two-dimensional scanning apparatus and scans an original such as a document in two directions to generate an electrical signal responsive to image information on the original. Optical disk drive apparatuses 3 in changing apparatus 4 serves to sequentially store the image information, which is read by reading apparatus 2 and supplied through main controller 1, in optical disks 9 as information recording media. Keyboard 5 is used to input specific retrieval codes corresponding to the image information and various operation commands. Output apparatus 6 comprises, e.g., a cathode-ray tube display device (i.e., CRT display device). Output apparatus 6 displays the image information read by reading apparatus 2, image information read from optical disk drive apparatuses 3, retrieval codes read from floppy disk apparatus 8, and retrieval codes entered at keyboard 5, all supplied through controller 1.

Recording apparatus 7 prints out, in the form of hard copies, the image information read by reading apparatus 2 and supplied through main controller 1 or the image information read out from optical disk apparatuses 3 and supplied through controller 1. Floppy disk apparatus 8 is used to store a floppy disk with retrieval data for every image information, consisting of a retrieval code entered at keyboard 5, and a memory address of optical disk 9 for storing image information corresponding to this retrieval code.

Figure 2:
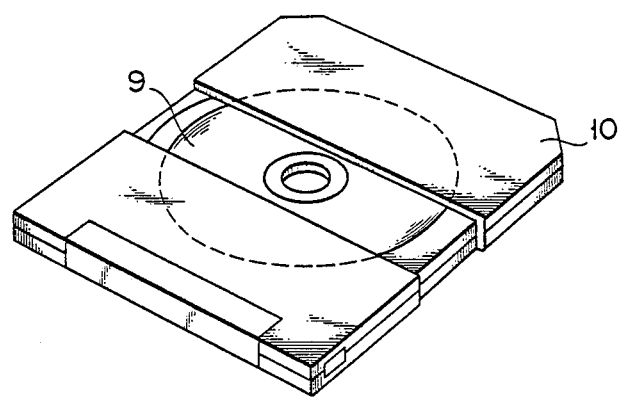
FIG. 2 is a perspective view of an optical cassette.

Information forming layers are formed on both major surfaces of optical disk 9 and are subjected to read/write access with laser beams. Optical disk 9 is housed in disk cassette 10, as is shown in FIG. 2.

Figure 3:
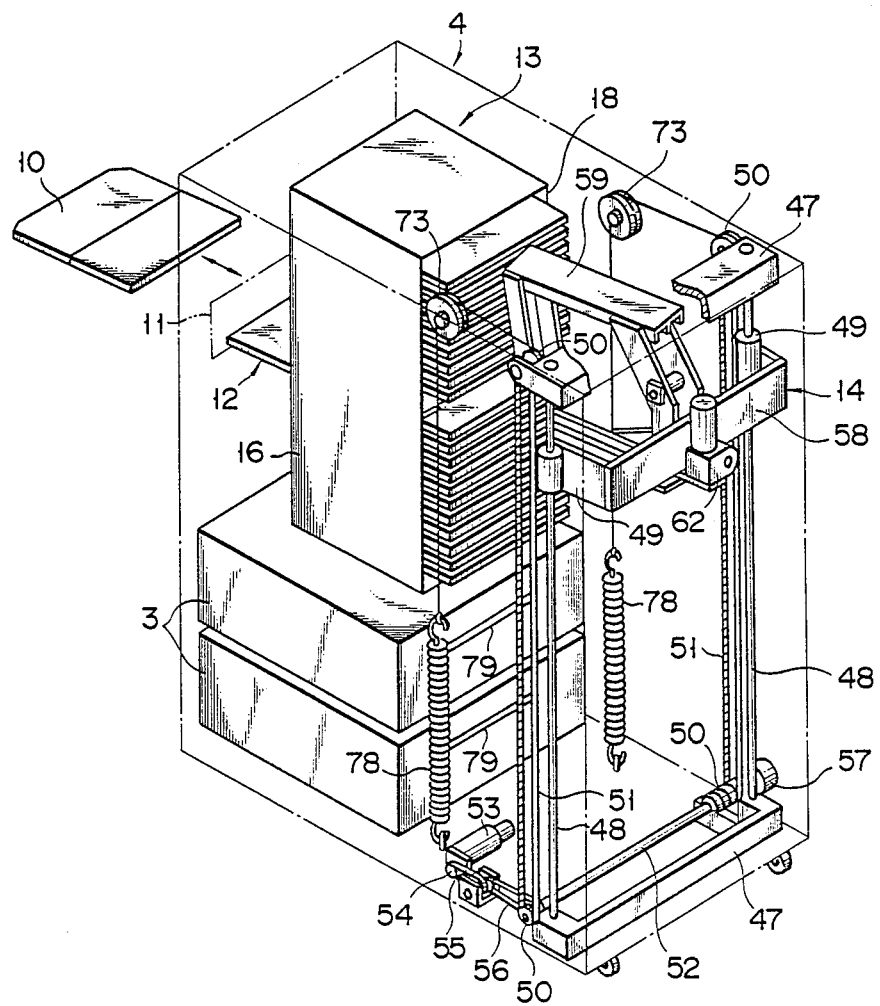

The front wall of disk changing apparatus 4 is formed with slot 11 through which disk cassette 10 is horizontally carried in and out apparatus 4. As is shown in FIG. 3, changing apparatus 4 comprises carrying mechanism 12 for carrying disk cassette 10 through slot 11, storage section 13 for storing a plurality of cassettes 10 carried by transfer mechanism 12, two optical disk drive apparatuses (information recording/reproducing apparatuses) 3 for read/write-accessing disk 9 in disk cassette 10, and transfer mechanism 14 for transferring disk cassette 10 between optical disk drive apparatuses 3, carrying mechanism 12 and storage section 13. Storage section 13 and apparatuses 3 are aligned along a Z direction (i.e, the vertical direction).

Figure 4:
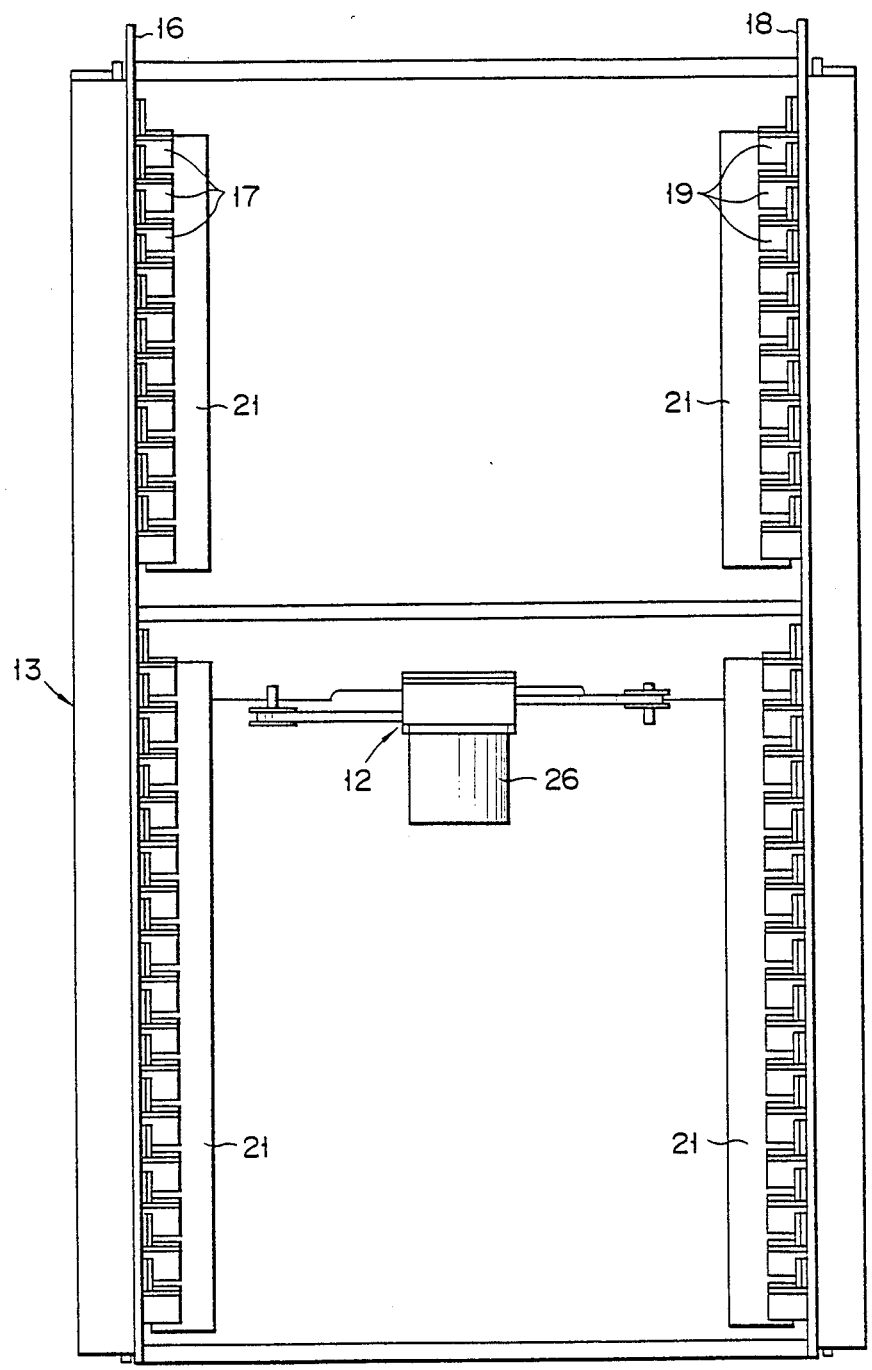
Figure 5:
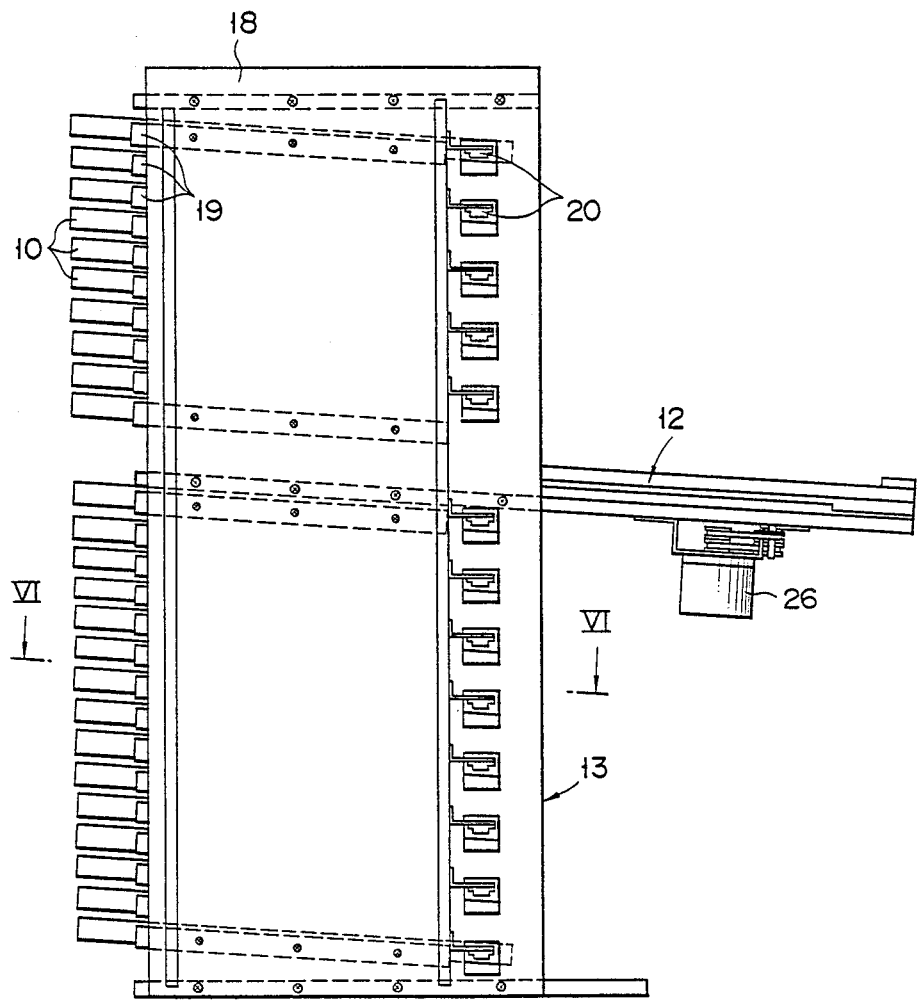
Figure 6:
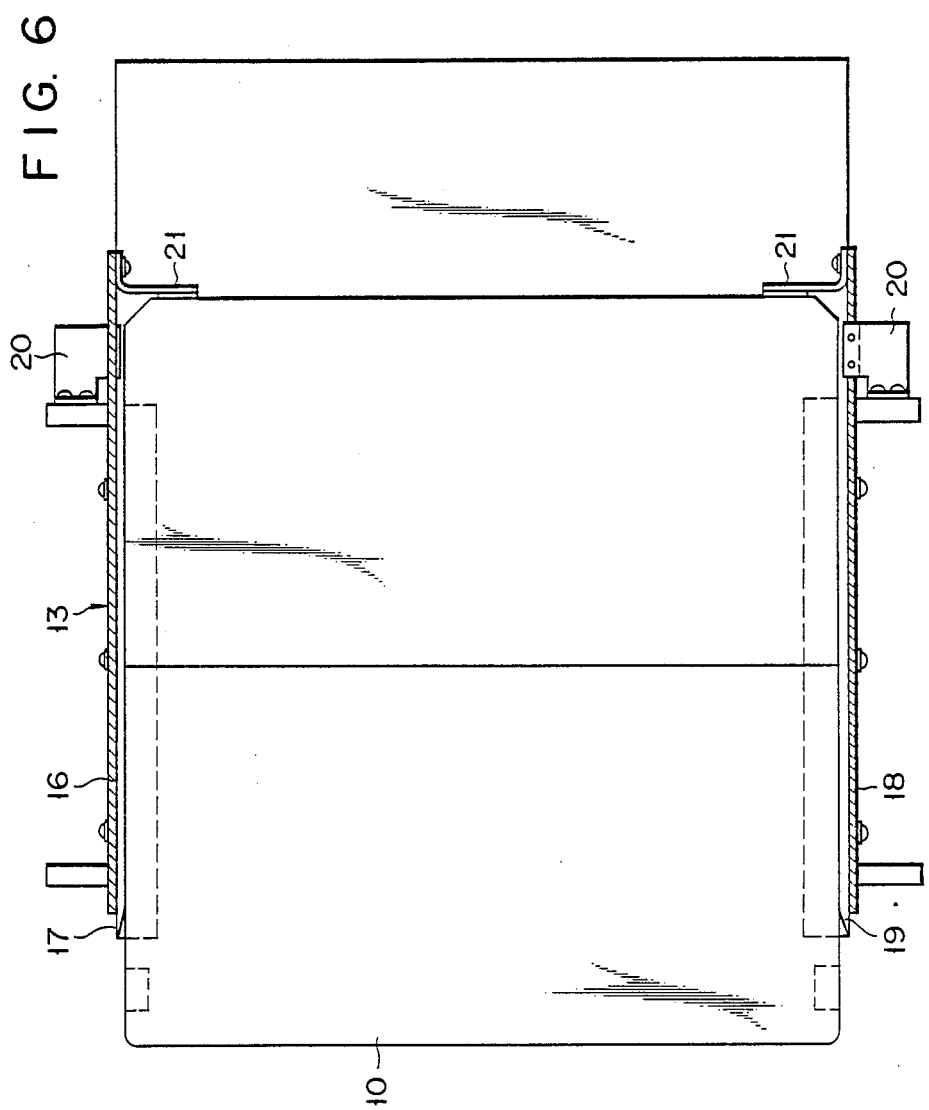
Figure 7:
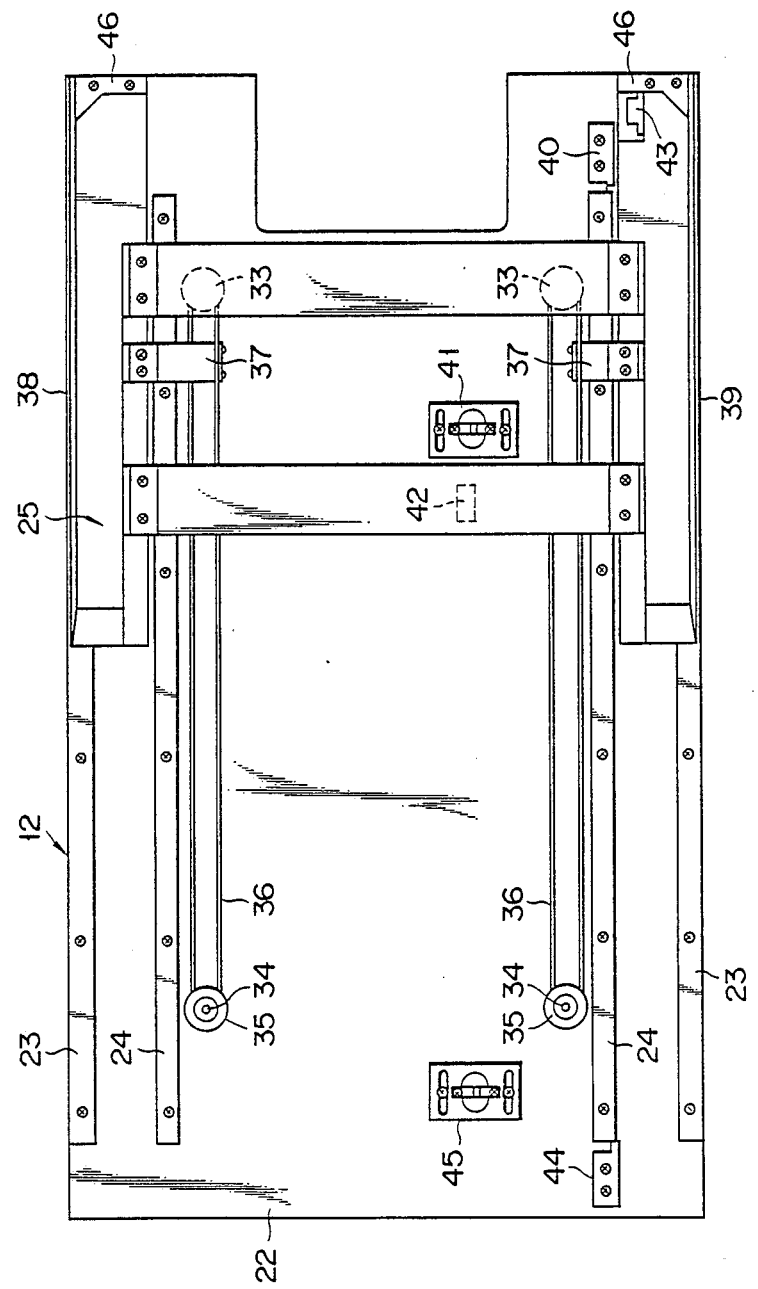
Figure 8:
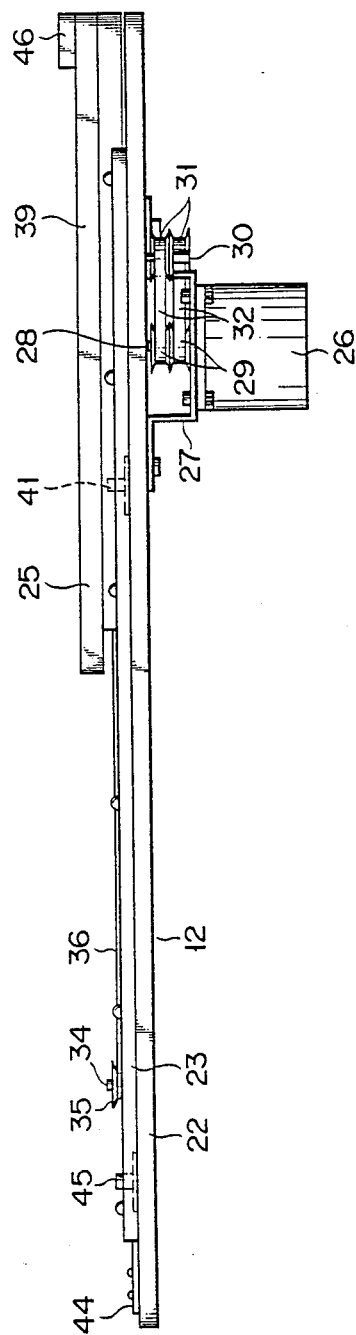
Figure 9:
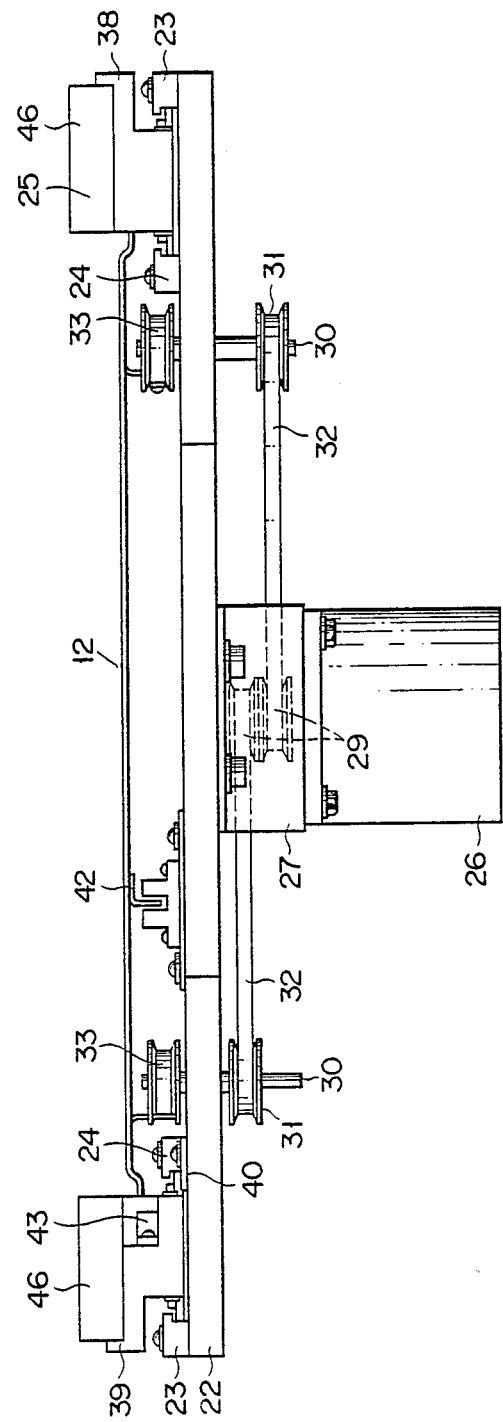

Storage section 13 stores a large number of cassettes 10 such that cassettes 10 are vertically (Z direction) stacked with a predetermined space therebetween while each cassette lies substantially horizontally (in Y direction) and partially extends backward. Cassettes 10 can be stored in or removed from the rear side of storage section 13 by carrying mechanism 14. As is shown in FIGS. 4 to 6, storage section 13 comprises frames 16 and 18 constituting the right and left side walls. A large number of guides 17 are fixed to frame 16 to guide the right side edge of cassette 10. Similarly, a large number of guides 19 are fixed to frame 18 to guide the left side edge of cassette 10. A pair of first detectors 20 for detecting the storage of cassette 10 are arranged at the distal end portions of the guides 17 and 19 of each stage. Left and right guides 17 and 19 are mounted on left and right frames 16 and 18 such that the front end of cassette 10 supported by the guides is slightly inclined downward. A distance between two adjacent guides 17 (or 19) is slightly larger than the thickness of cassette 10 to allow easy insertion of the cassette therebetween. Cassettes 10 stored in storage section 13 are positioned by corresponding stoppers 21 and are free from positional errors caused by vibrations or the like.

As is shown in FIGS. 3 to 5 and 7 to 12, carrying mechanism 12 is located at the center of storage section 13. Mechanism 12 transfers cassette 10 from slot 11 to a position wherein the cassette lies the same state as those of other cassettes 10 already stored in storage section 13 and transfers cassette 10 in section 13 back to slot 11.

Carrying mechanism 12 comprises rectangular base 22 extending from storage section 13 to slot 11 along the Y direction. A pair of first guide rails 23 and another pair of second guide rails 24 are fixed by screws on base 22 and are parallel to each other. First guide rails 23 are fixed along the side edges of base 22, and second guide rails 24 are fixed between first guide rails 23. Slider 25 is mounted on base 22 to be slidable along first and second guide rails 23 and 24 in the Y direction (the back-and-forth direction). Slider 25 is driven upon rotation of stepping motor 26. Motor 26 is mounted on the lower surface of the front end of base 22 by means of support frame 27. A pair of pulleys 29 are mounted on rotating shaft 28 of motor 26. A pair of shafts 30 vertically extend through base 22. Pulleys 31 are mounted on shafts 30, respectively, and are located below base 22. Belts 32 are looped between pulleys 31 and pulleys 29, respectively. Pulleys 33 are respectively mounted on shafts 30, respectively, and are located above base 22. A pair of pulleys 35 are rotatably mounted on the upper surface of the rear end portion of base 22 by means of shafts 32. Belts 36 are looped between pulleys 33 and corresponding pulleys 35, respectively, and extend along the Y direction. Part of each belt 36 is connected to slider 25 through brackets 37, respectively. When stepping motor 26 is rotated in the forward and reverse directions, slider 25 can reciprocate along the Y direction. Projections 38 and 39 extend along the Y direction on both side edges of slider 25 so as to guide both side surfaces of cassette 10.

Stopper 40 is fixed by screws on the upper surface of the front end portion of base 22 and is designed to abut against slider 25. The initial position of slider 25 is defined as a position where slider 25 abuts against stopper 40. Whether or not slider 25 is located in the initial position is detected by second detector 41. More specifically, detector 41 includes a light source (not shown) fixed on base 22 and a light receiving element for receiving light from the light source. Detector 41 also has a recess. Light-shielding plate 42 is fixed to the lower surface of slider 25. When slider 25 is located in the initial position, light-shielding plate 42 is inserted in the recess of detector 41 to shield the light-receiving element from the light source, thereby detecting that slider 25 is located in the initial position. Third detector 43 is arranged on slider 25 to detect whether or not the insertion direction of cassette 10 is correct. Stopper 44 is fixed by screws on the upper surface of the rear end portion of base 22 and is designed to abut against slider 25. The advanced position of slider 25 is defined as a position where slider 25 abuts against stopper 44. When slider 25 is moved to the advanced position, cassette 10 on slider 25 is held in the same state as that of other cassettes 10 which have already been stored in storage section 13. Whether or not slider 25 is located in the advanced position is detected by fourth detector 45. Detector 45 is fixed on base 22 and is constructed the same manner as detector 41. When light-shielding plate 42 fixed on the lower surface of slider 25 is inserted in the recess of detector 45, light from the light source to the light-receiving element is shielded by plate 42, thereby detecting that slider 25 is located in the advanced position. A pair of guides 46 are mounted on the end of slider 25 at the side of slot 11 to align the leading end of cassette 10.

Figure 10:
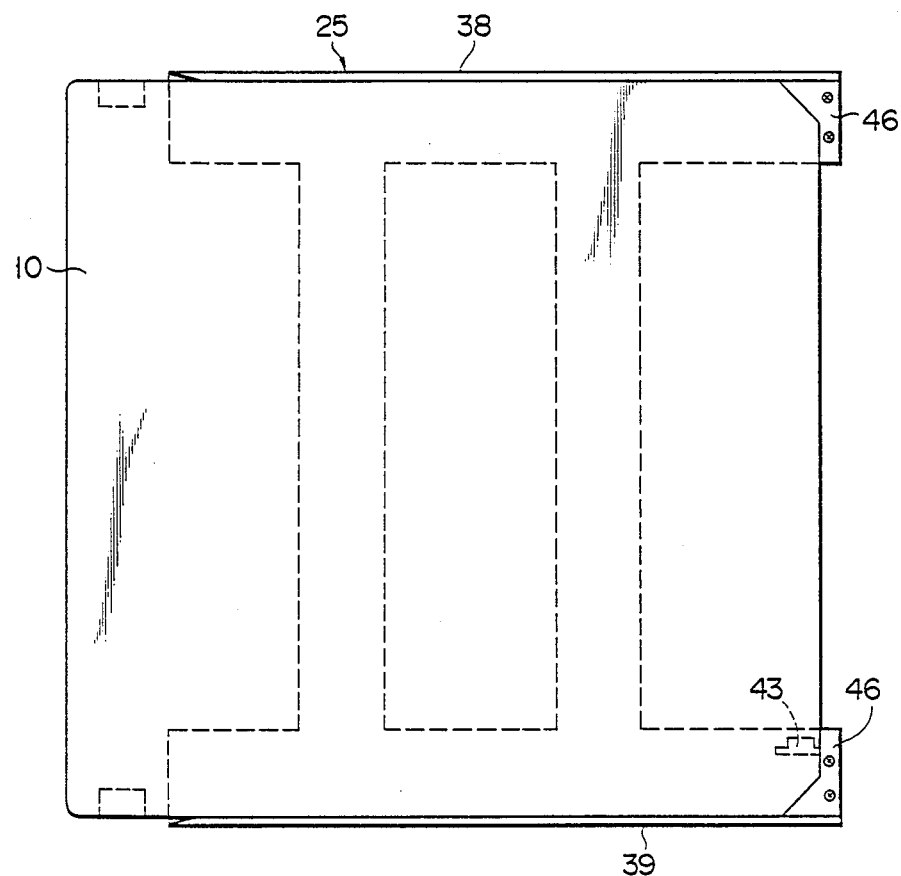
Figure 11:
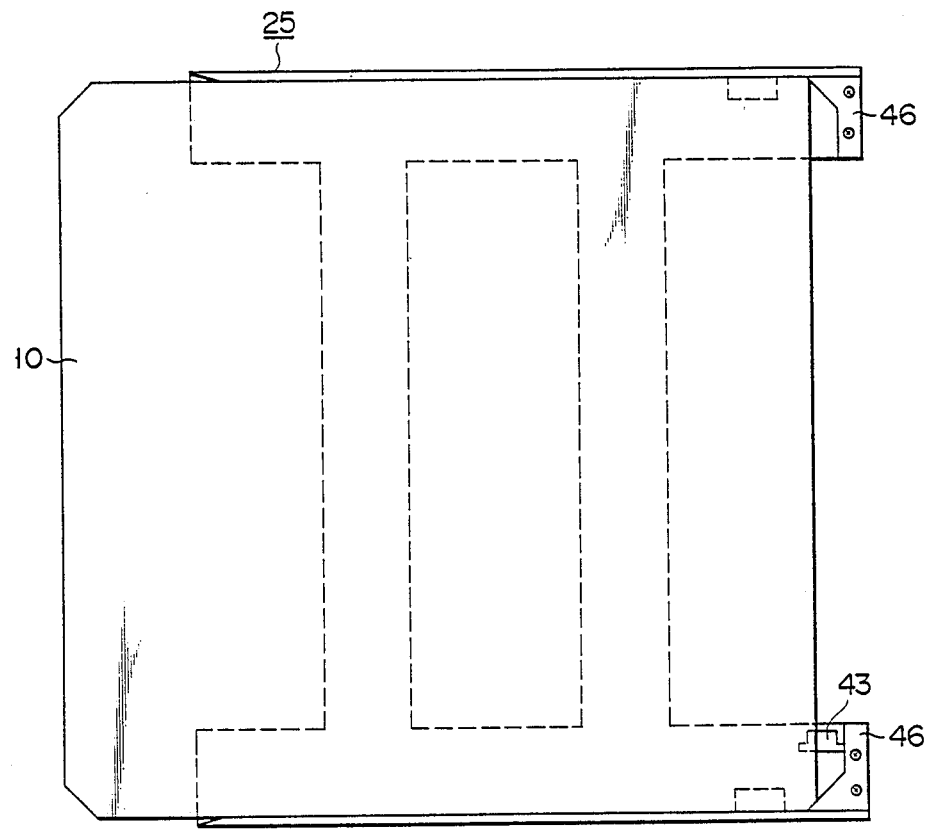

Guides 46 and detector 43 respectively detect whether or not the insertion direction of cassette 10 is proper and whether or not cassette 10 is accurately located in the correct position. As is shown in FIG. 10, when cassette 10 is placed on slider 25 such that the chamfered corners of the front end portion of cassette 10 faces guides 46, cassette 10 is inserted in the correct direction. In this case, cassette 10 can be detected by detector 43. However, if the insertion direction of cassette 10 is reversed, cassette 10 cannot be placed at the correct position on slider 25 due to the presence of guides 46, as is shown in FIG. 11. In this case, since cassette 10 is not detected by detector 43, the incorrect direction of the cassette can be detected.

Figure 12:
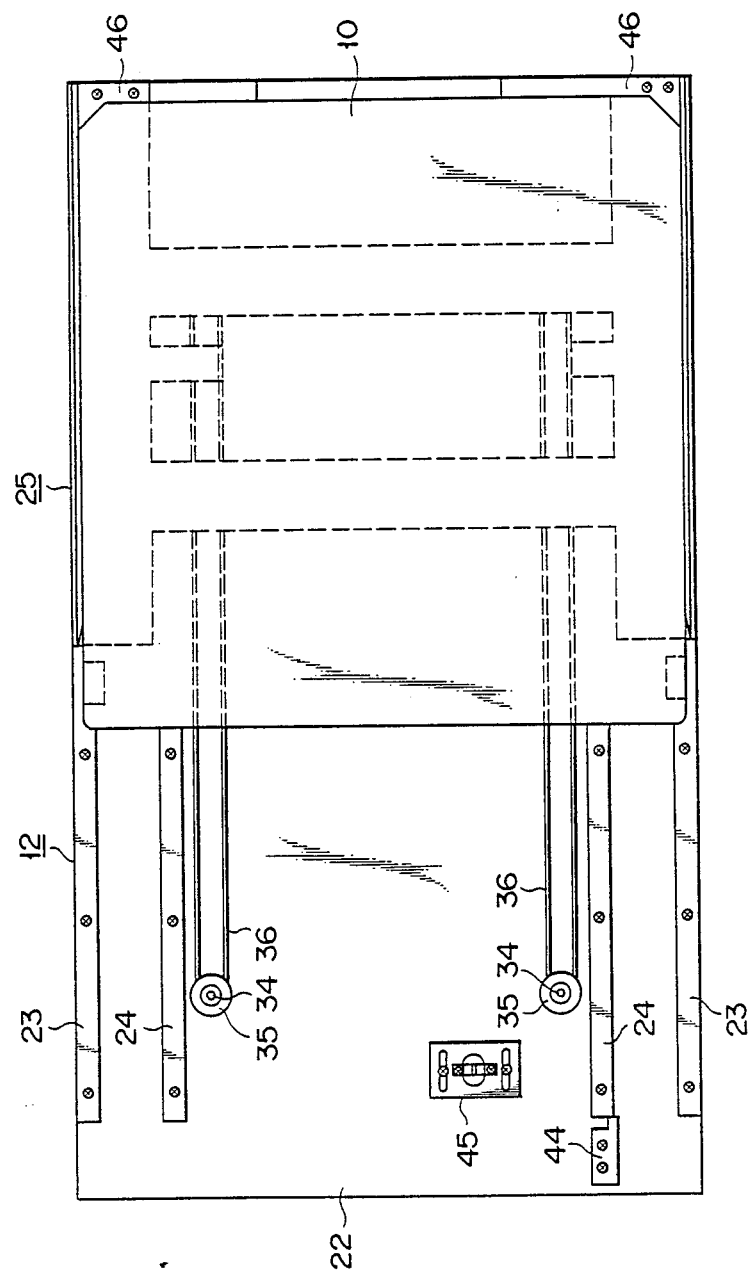
Figure 13:
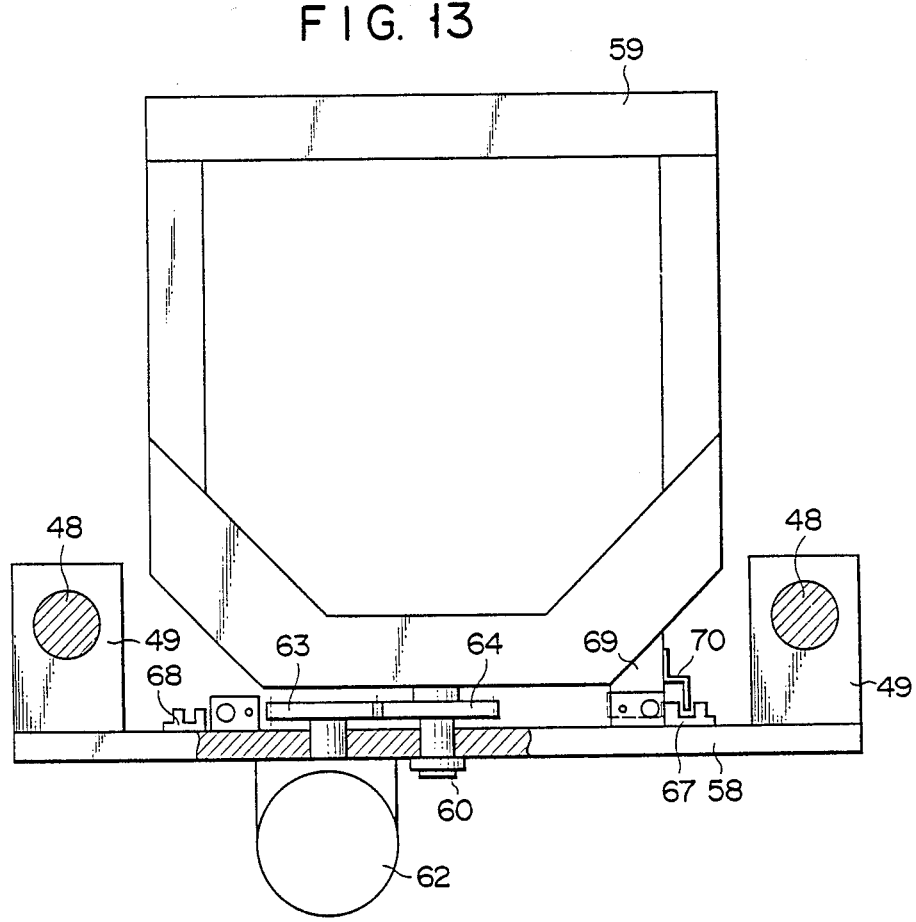
Figure 14:
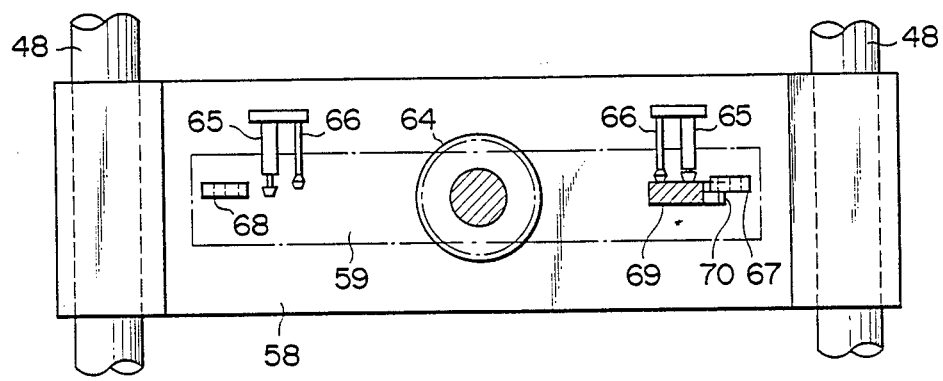

When guides 46 and detector 43 detect that cassette 10 is placed on slider 25 along the correct direction and properly loaded on slider 25, cassette 10 can be carried. When stepping motor 26 is rotated in the forward direction, slider 25 which supports cassette 10 thereon is moved in a direction toward storage section 13, as is shown in FIG. 12. Slider 25 is stopped at a position (i.e., the advanced position) where fourth detector 45 detects light-shielding plate 42. In the advanced position, cassette 10 placed on slider 25 is held in the same state as that of other cassettes 10 which have already been stored in storage section 13. Since stepping motor 26 is used as a drive source for slider 25, slider 25 can be kept in the advanced position by the self retaining force of the motor. Cassette 10 received in storage section 13 by carrying mechanism 12 can be processed in the same manner as other cassettes 10 stored in storage section 13.

Transfer mechanism 14 will be described in detail. As is shown in FIG. 3, mechanism 14 comprises a pair of parallel guide shafts 48. Shafts 48 oppose storage section 13 and optical disk drive apparatuses 3 and extend along the Z direction. The upper and lower ends of shafts 48 are fixed to a pair of horizontal frames 47, respectively. Carriage 49 is mounted on each guide shaft 48 to be movable along the Z direction. Carriages 49 are connected to each other by arm base 58. Two rollers 50 are mounted on each frame 47 and are located on the upper and lower end sides of corresponding guide shaft 48. Belts 51 are looped between two pairs of rollers 50 along guide shafts 48, respectively. Lower rollers 50 are connected to each other by shaft 52 and are rotated together. A driving force of servo motor 53 is transmitted to shaft 52 through pulley 54, belts 55 and 56, and the like. Parts of belts 51 are coupled to corresponding carriages 49. When servo motor 53 is rotated in the forward direction, carriages 49 are moved by corresponding belts 51 along the Z direction. Absolute encoder 57 is mounted at one end of shaft 52 to detect a rotational position of shaft 52, thereby constantly detecting the absolute positions of carriages 49. More specifically, encoder 57 detects the position of carriages 49 as a coordinate position in the moving coordinate system of the carriages.

Shaft 60 is fixed to the center of arm base 58 and horizontally extends therefrom, as is shown in FIGS. 3 and 13 to 16. Double transfer frame 59 is rotatably mounted on shaft 60 by means of bearing 61. Frame 59 comprises first and second holding frames 71 and 72 integrally formed with each other. Warm-geared motor 62 is mounted on arm base 58. A driving force of motor 62 is transmitted to frame 59 through first spur gear 63 mounted on the output shaft of motor 62 and second spur gear 64 which is mounted on frame 59 to be rotatable about shaft 60 and meshed with gear 63. When motor 62 is rotated in the forward/reverse direction, double transfer frame 59 is rotated through 180 degrees in the forward/reverse direction and is stopped horizontally. A pair of shock absorbers 65, a pair of adjustment stoppers 66, and fifth and sixth detectors 67 and 68 are symmetrical about shaft 60 and are mounted on arm base 58. Arm stopper 69 and light-shielding plate 70 are mounted on frame 59 and are spaced apart from shaft 60 and oppose arm base 58. When frame 59 is rotated from the horizontal position, plate 70 is detected by detector 67 or 68. Motor 62 is then deenergized, and frame 59 is rotated by its inertia. When arm stopper 69 abuts against corresponding shock absorber 65 and the impact is absorbed thereby, stopper 69 urges corresponding adjustment stopper 66, thereby stopping rotation of frame 59. Since arm stopper 69 is urged against stopper 66 and is thus stopped, play is not caused by gear meshing of first and second spur gears 63 and 64 and the like, and frame 59 can be accurately located in position. In the position where light-shielding plate 70 is detected by fifth detector 67, first cassette holding frame 71 in frame 59 faces upward. However, in the position where plate 70 is detected by detector 68, second cassette holding frame 72 faces upward.

Figure 18:
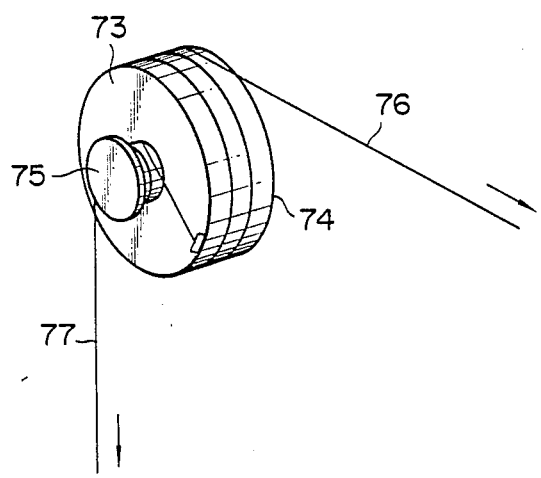
Figure 19:
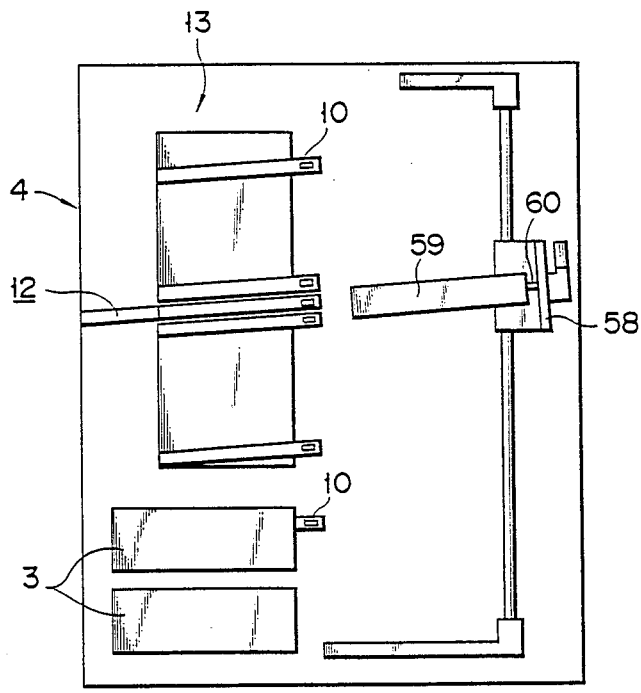

As is shown in FIGS. 3 and 18, a pair of wheels 73 are rotatably mounted on upper frame 47 through a support arm (not shown). Each wheel 73 comprises large and small-diameter rollers 74 and 75 which are concentric and formed integrally. One end of each of two wires 76 and 77 is fixed to a corresponding one of wheels 73. An intermediate portion of wire 76 is wound around roller 74 and a fixed roller (not shown). The other end of wire 76 is fixed to corresponding carriage 49. The intermediate portion of wire 77 is wound around small-diameter roller 75, and the other end of wire 77 is connected to one end of spring 78. The other end of spring 78 is connected to lower frame 47. The weight of carriage 49 is balanced with the tension force of spring 78. Cassettes 10 are stored in storage section 13 in an inclined manner. As is shown in FIG. 19, shaft 60 as the rotational center of frame 59 and frame 59 are also inclined at the same angle as that of cassette 10. By this inclination, cassette 10 can be inserted into or removed from slot 79 (FIG. 1) of each optical disk drive apparatus 3.

Figure 17:
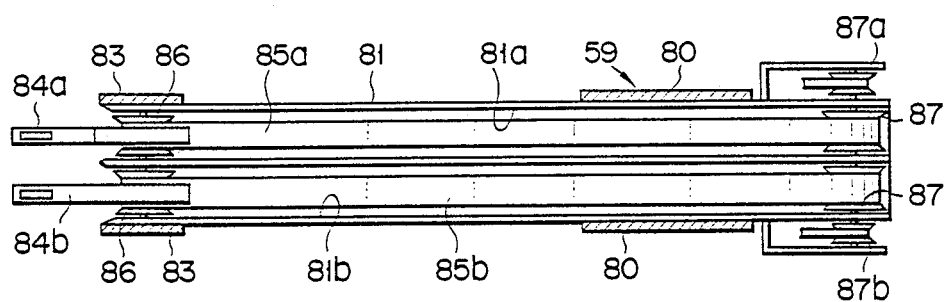
Figures 20A, 20B:
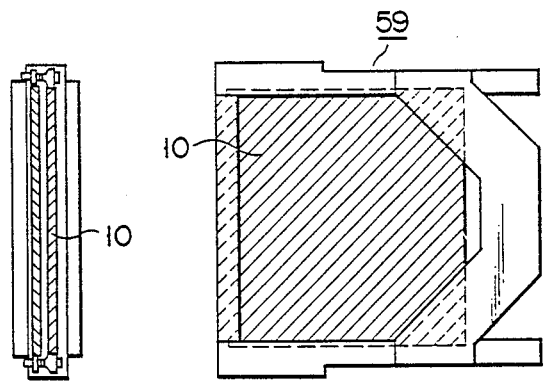
FIGS. 20A and 20B are respectively a front view and a plan view showing a state wherein a cassette is stored in the transfer frame.
Figure 21:
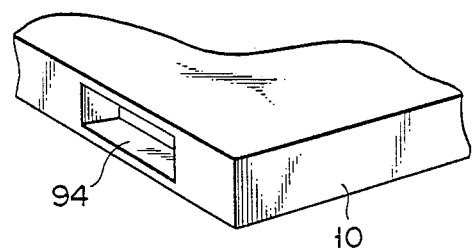

As is shown in FIGS. 15 to 17, double transfer frame 59 comprises rear frame member 80, a pair of parallel side frame members 81 and 82, and front frame member 83 and has a substantially rectangular shape. Frame 59 is supported while rear frame member 80 is mounted on shaft 60. Stopper 69 and light-shielding plate 70 are fixed to the rear frame member. A pair of parallel guide grooves 81a and 81b are formed in the inner surface of side frame member 81 throughout the entire length thereof. A pair of guide rollers 86 are coaxially and rotatably mounted on the front end of frame member 81 and are located in the front end portions of guide grooves 81a and 81b. A pair of guide rollers 87 are coaxially and rotatably mounted on the rear end of frame member 81, and are located in the rear end portions of guide grooves 81a and 81b. Belt 85a is looped between rollers 86 and 87 located inside guide groove 81a. Similarly, belt 85b is looped between rollers 86 and 87 located inside guide groove 81b. Belts 85a and 85b run endlessly along guide grooves 81a and 81b, respectively. In the same manner as in side frame member 81, a pair of parallel guide grooves 82a and 82b are formed in side frame member 82. Guide rollers 86 and 87 are located at the front and rear ends of each of guide grooves 82a and 82b. Belts 85a and 85b are looped between guide rollers 86 and 87 and designed to run along the guide grooves. Each of guide grooves 81a, 81b, 82a, and 82b has a width slightly larger than the thickness of cassette 10, so that the side edge portions of the cassette can be inserted in the guide grooves. More specifically, guide grooves 81a and 82a constitute first holding frame 71 for holding cassette 10. Guide grooves 81b and 82b constitute second holding frame 72. The distance between guide grooves 81a and 81b and between guide grooves 82a and 82b is the same as the pitch of guides 17 (or 19) in storage section 13. As shown in FIGS. 20A and 20B, cassette 10 is transferred with being completely held in the holding frames. First and second holding frames 71 and 72 are arranged to be symmetrical about shaft 60 as the center of rotation. When frame 59 is rotated through 180 degrees, the positions of holding frames 71 and 72 are reversed.

Belt 85a is driven by stepping motor 88 arranged on frame member 80. A driving force of motor 88 is transmitted to belt 85a on the side of side frame member 82 through pulley 89 mounted on the rotating shaft of motor 88, belt 90, pulley 87a concentric with roller 87, and roller 87. The driving force is transmitted to belt 85a on the side of side frame member 81 through pulley 89, belt 91, a pair of pulleys 92, belt 93, pulley 87a, and rollers 87. Belts 85b are driven independently of belts 85a by a drive mechanism having the same structure described above.

Sliding pawls 84a and 84b are fixed to belts 85a and 85b, respectively, and run together with the corresponding belts along guide grooves 81a and 81b (82a and 82b). Each pawl is designed to engage with recess 94 (FIG. 21) formed at an end portion of each side surface of cassette 10. Belts 85a (or 85b) are driven while pawls 84a (or 84b) are respectively engaged with recesses 94, and then the cassette can be inserted in the holding frames along the guide grooves or removed therefrom.

Figure 22A:
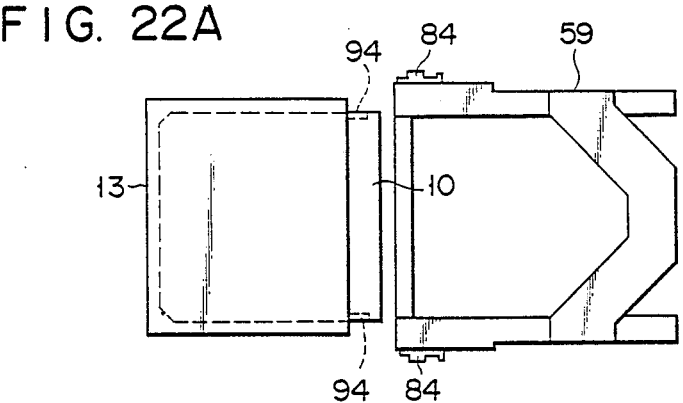
FIGS. 22A to 22C are schematic plan views showing processes of carrying the cassette from the storage section in the transfer frame.
Figure 22B:
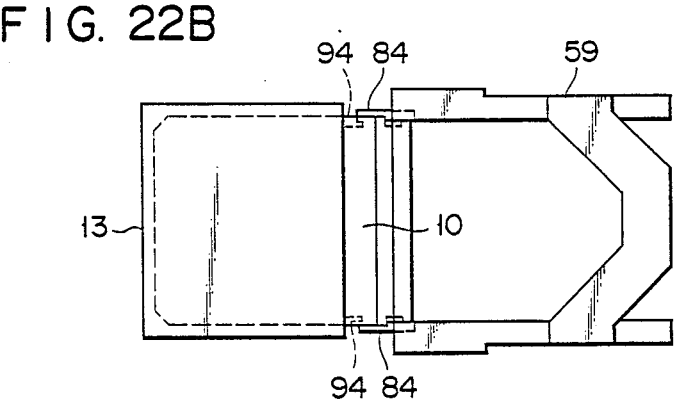
Figure 22C:
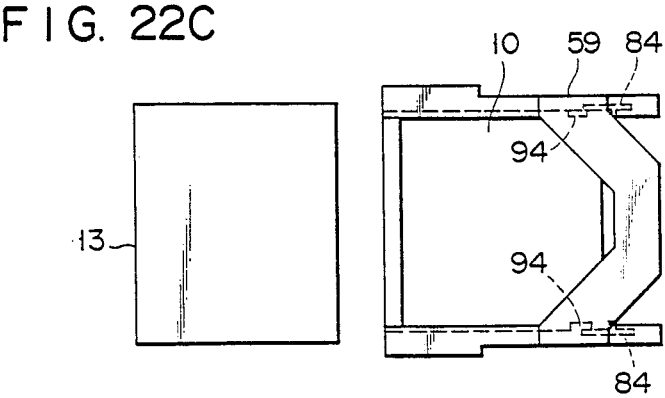

When desired cassette 10 is to be carried in frame 59 from storage section 13, frame 59 is moved to a position where one of the holding frames thereof opposes the desired cassette, as is shown in FIG. 22A. In this state, sliding pawls 84 are out of the guide grooves of the holding frames. Subsequently, as is shown in FIG. 22B, pawls 84 are driven and engaged with recesses 94 of cassette 10, respectively. When pawls 84 are further driven, cassette 10 is received by the holding frame, as is shown in FIG. 22C.

In order to transfer cassette 10 from frame 59 into storage section 13 or from frame 59 into disk drive apparatus 3, the operation procedures are reversed.

As is shown in FIG. 19, cassette 10 ejected from optical disk drive apparatus 3 is located in the same state as that of other cassettes 10 stored in storage section 13. For this reason, cassette 10 can be carried from disk drive apparatus 3 in transfer frame 59 with the same manner as in the case wherein cassette 10 is carried from the storage section in the transfer frame. In addition, the ejection procedures are identical in the above operations.

Figure 23A:
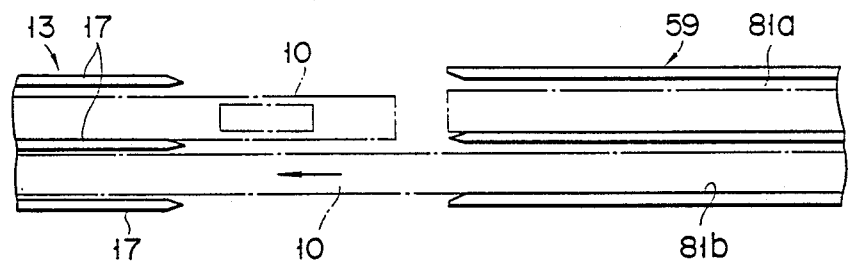
FIGS. 23A and 23B are schematic views showing the positional relationships between the transfer frame and the storage section when cassette loading and cassette ejection are respectively performed.
Figure 23B:
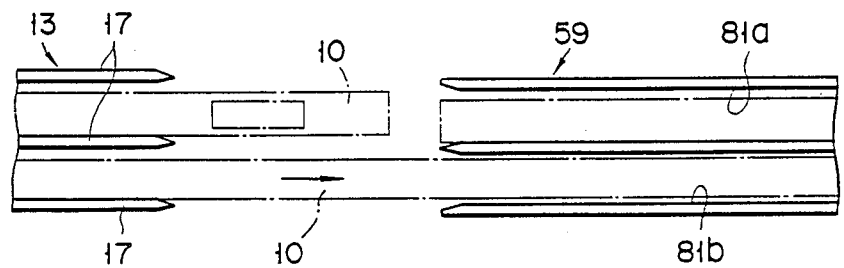

As described above, the width of each guide groove of frame 59 is larger than the thickness of cassette 10, so that the cassette can be easily inserted in frame 59. Similarly, the pitch of guides 17 and 19 in storage section 13 is larger than the thickness of cassette 10. Therefore, the cassette can be easily received by the storage section. When cassette 10 is to be carried from frame 59 in storage section 13, frame 59 is positioned such that the cassette held therein is located between adjacent guides 17 (19) in the storage section, as is shown in FIG. 23A. However, when cassette 10 is to be taken into frame 59 from storage section 13, frame 59 is positioned such that the cassette is located at the middle portion of guide groove 81a or 81b, as is shown in FIG. 22B.

When cassette 10 is to be inserted in or removed from disk drive apparatus 3, frame 59 is positioned in the same manner as described above.

In transfer mechanism 14 having the structure described above, cassette 10 carried in storage section 13 by transfer mechanism 12 is loaded once in optical disk drive apparatus 3. Drive apparatus 3 reads information from disk 9 and discriminates side A or B of disk 9. On the basis of such discrimination information, cassette 10 is stored in an empty space in storage section 13 in the same orientation as that of other cassettes. Transfer mechanism 14 performs the following operations: a loading operation for transferring designated disk cassette 10 from storage section 13 to designated optical disk drive apparatus 3 and loading it therein; an ejecting operation for transferring cassette 10 ejected from designated disk drive apparatus 3 to storage section 13 and storing it where it was; a disk changing operation as a combination of loading and ejecting operations; a reversing operation for taking out cassette 10 from designated disk drive apparatus 3, reversing the side from side A to side B and vice versa, and loading the reversed cassette into disk drive apparatus 3 again; and a returning operation for taking out designated disk cassette 10 from storage section 13, and conveying it to carrying mechanism 12, and causing mechanism 12 to carry out it from slot 11.

Figure 24A:
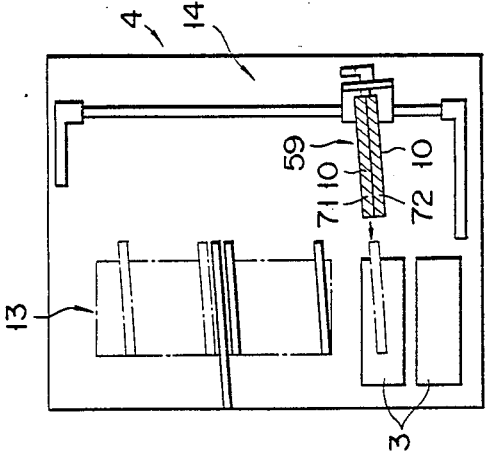
Figure 24B:
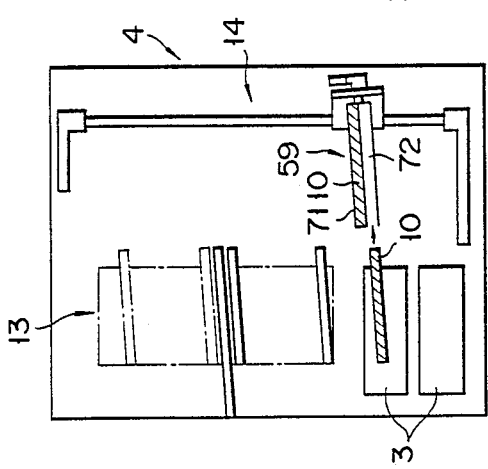
Figure 24C:
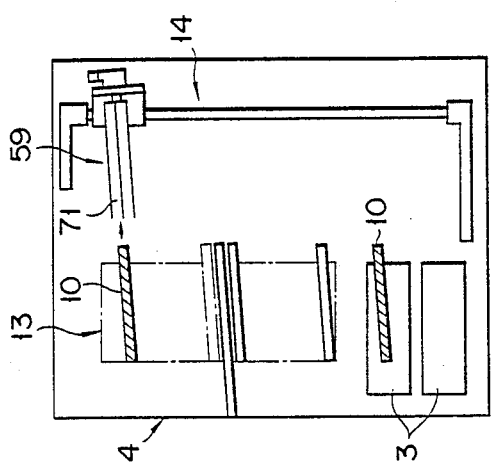

The overall operation of automatic disk changing apparatus 4 will be described with reference to FIGS. 24A to 24E, wherein the disk changing operation is exemplified. First, an operator inputs a processing instruction, that is, a signal indicative of the specific disk cassette 10 to be loaded into disk drive apparatus 3, on main controller 1. Controller 1 delivers a signal, which is indicative of a target-coordinate position to which transfer frame 59 is to be moved, that is, the coordinate position of the designated disk cassette. At this time, the current-coordinate position of transfer frame 59 detected by encoder 57 is stored in controller 1. In controller 1, the current-coordinate position is substracted from the target-coordinate position. In accordance with the calculation result, controller 1 delivers control data for controlling speed and direction of servo motor 53. If the difference between the current and target-coordinate positions is relatively great, controller 1 delivers control data for moving transfer frame 59 at constant speed. As frame 59 approaches the target-coordinate position, thus reducing the value of the subtraction result, controller 1 delivers control data for moving frame 59 in a decelerating manner. As a result, the rotating speed of motor 53 and therefore, the moving speed of frame 59, are lowered. When the control data is delivered to motor 53, transfer frame 59 is moved to a position where, for example, first holding frame 71 opposes designated disk cassette 10, as is shown in FIG. 24A. Cassette 10 is taken into holding frame 71. Subsequently, by repeating the aforesaid operation, frame 59 is moved to a position where second holding frame 72 opposes designated optical disk drive apparatus 3, as is shown in FIG. 24B. Meanwhile, cassette 10 is ejected from disk drive apparatus 3. Subsequently, cassette 10 ejected from apparatus 3 is taken into second holding frame 72. As is shown in FIG. 24C, frame 59 is moved to a position where cassette 10 in holding frame 71 can be inserted in apparatus 3. Cassette 10 is then loaded in apparatus 3. Then, a control data is delivered from controller 1 to motor 53, and frame 59 is moved to a position where second holding frame 72 opposes that portion in the storage section 13 wherein cassette 10 held by frame 72 was stored, as is shown in FIG. 24D. Cassette 10 held by frame 72 is then returned to the position where it was in storage section 13. In the state shown in FIG. 24E, the disk changing operation is completed.

In the above description, the disk changing operation does not accompany rotation of transfer frame 59. However, when cassette 10 is to be inserted in the optical disk drive apparatus, frame 59 may be rotated through 180 degrees to reverse the side of the cassette, and the reversed cassette may be inserted in disk drive apparatus 3. Various operations can be performed by combining the rotating operation and another operation of double transfer frame 59.

The automatic changing apparatus having the arrangement described above has the following advantages. Transfer frame 59 comprises first and second holding frames 71 and 72 for respectively holding the cassettes. For this reason, when the cassette in disk drive apparatus 3 is to be changed with another cassette, frame 59 can hold both the cassette transferred from storage section 13 and the cassette ejected from disk drive apparatus 3. Therefore, the cassettes can be changed by one reciprocal cycle of the transfer frame between the storage section and the disk drive apparatus, thereby greatly shortening the cassette changing operation. The distance between the first and second holding frames is the same as the pitch of the guides in the storage section. At the same time, the positions of the first and second holding frames are reversed upon rotation of the transfer frame through 180 degrees. For these reasons, the number of positioning points of the transfer frame with respect to the storage section is small. Thus, positioning control along the vertical direction, i.e., a direction along which the transfer frame is moved, can be easily performed.

The present invention is not limited to the particular embodiment described above. Various changes and modifications may be made within the spirit and scope of the invention. In the above embodiment, the information memory media are stacked vertically. However, the stacking direction may be horizontal. In this case, the transfer frame is moved horizontally.

What is claimed is:

1. An apparatus for automatically changing an information memory medium in which information is recorded, comprising:
   means for storing a number of information memory media;
   means for processing information recorded in an information memory medium; and
   means for transferring information memory media between the storing means and the processing means, the transfer means including a transfer frame having first and second holding members each of which are adapted to hold an information memory medium, first drive means for moving an information memory medium between the storing means and the first holding member, and second drive means for moving an information memory medium between the storing means and the second holding member, the transfer frame being rotatable through 180 degrees between a first position and a second position wherein the positions of the first and second holding members are reversed with respect to each other.

2. An apparatus according to claim 1, wherein said storing means and processing means are located at the same side of the transfer means.

3. An apparatus according to claim 1, wherein each of said first and second holding members has an end opening through which an information memory medium is taken into and taken out therefrom, and an end wall portion arranged to oppose the end opening and to abut against an end edge of the medium taken into the holding member, said end wall portions of the first and second holding member constituting said first and second positioning means, respectively.

4. An apparatus according to claim 1, wherein said information recording media are arranged parallel to one another and stacked with predetermined intervals therebetween in said storing means, and said first and second holding members are parallel to each other and are located within a plane parallel to the information memory media stored in the storing means.

5. An apparatus according to claim 4, wherein a distance between two adjacent ones of the information memory media stored in the storing means is the same as a distance between the first and second holding members.

6. An apparatus according to claim 5, wherein said transfer frame is arranged to be rotatable, about a central axis extending parallel to the memory media in the storing means, through 180 degrees between the first and second positions wherein the first and second holding members are located within the plane parallel to the information memory media stored in the storing means, the first and second holding members being symmetrical about the central axis; and the transfer means includes a rotation drive mechanism for rotating the transfer frame and positioning means for selectively positioning the transfer frame to the first or second position.

7. An apparatus according to claim 6, wherein said transfer means includes a guide member extending parallel to the stacking direction of the information memory media, a carriage movable along the guide member, and a carriage drive mechanism for moving the carriage, the transfer frame being mounted on the carriage.

8. An apparatus according to claim 7, wherein the transfer means includes a rotating shaft mounted on the carriage and defining the central axis, the transfer frame being rotatably mounted on the rotating shaft.

9. An apparatus according to claim 8, wherein said positioning means includes a stopper mounted on the transfer frame, a first lock portion against which the stopper abuts upon rotation of the transfer frame to the first position, and a second lock portion against which the stopper abuts upon rotation of the transfer frame to the second position, the first and second lock portions provided at the carriage.

10. An apparatus according to claim 9, wherein each of said first and second lock portions has a shock absorber and a stopper.

11. An apparatus according to claim 9, wherein said first lock portion includes a first sensor for causing the rotation drive mechanism to stop upon rotation of the transfer frame to a position near the first position, and the second lock portion includes a second sensor for causing the rotation drive mechanism to stop upon rotation of the transfer frame to a position near the second position.

12. An apparatus according to claim 1, wherein said transfer frame includes a pair of parallel side frame members, a front frame member, and a rear frame member, and is formed in a substantially rectangular shape, each of the side frame members being provided with first and second guide grooves extending parallel to the information memory media stored in the storing means, the first guide grooves constituting part of the first holding member and being formed to receive one side edge of the information memory medium, and the second guide groove constituting part of the second holding member and being formed to receive one side edge of the information memory medium.

13. An apparatus according to claim 12, wherein said first driving means includes a pair of first drive belts arranged to run along the first guide grooves, a pair of engaging members fixed to the first drive belts and moved together therewith, the engaging members being adapted to engage with the information memory medium, to cause the engaged information recording medium to take into the first holding member, or remove the engaged information memory medium from the first holding member upon running of the first drive belts, and a first belt drive mechanism for driving the first belts, and said second driving means includes a pair of second drive belts arranged to run along the second guide grooves, a pair of engaging members fixed to the second drive belts and moved together therewith, the engaging members being adapted to engage with the information memory medium, to cause the engaged information memory medium to take into the second holding member, or remove the engaged information memory medium from the second holding member upon running of the second drive belts, and a second belt drive mechanism for driving the second belts.

14. An apparatus according to claim 1, which further comprises a carrying mechanism for carrying the information memory medium in or out the storing means.

15. An apparatus according to claim 14, wherein said carrying mechanism comprises a base extending from the storing means in a direction parallel to the information memory media stored in the storing means and a slider on which the information memory medium is placed, the slider being mounted on the base to be slidable between a initial position outside the storing means and an advanced position where the information memory medium placed on the slider is located to oppose parallel to other information memory media stored in the storing means.

16. An apparatus according to claim 15, wherein said carrying mechanism includes a sensor for detecting a state of the information memory medium placed on the slider.

17. An apparatus for automatically changing an information memory medium in which information is recorded, comprising:
 means for storing a number of information memory media;
 means for processing information recorded in an information memory medium; and
 means for transferring information memory media between the storing means and the processing means, the transfer means including a transfer frame having first and second holding members each of which are adapted to hold an information memory medium, first drive means for moving an information memory medium between the storing means and the first holding member, and second drive means for moving an information memory medium between the storing means and the second holding member;
 said transfer frame including an pair of opposite side frame members which constitute part of the first and second holding members; and
 each of said first and second drive means including a pair of drive belts arranged to run along the side frame members, respectively, a pair of engaging members fixed to the drive belt and moving together therewith, the engaging members being to engage an information memory medium, to cause the engaged medium to move between the storing means and the holding member upon running of the drive belts, and a belt drive mechanism for running the belts.

* * * * *